Sept. 16, 1930.   V. G. APPLE   1,775,634
BAR WINDING OF DYNAMO ELECTRIC MACHINE ELEMENTS
Filed June 14, 1928   3 Sheets-Sheet 1
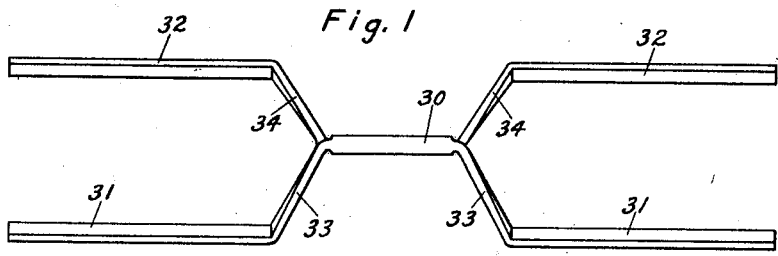 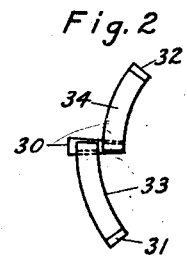
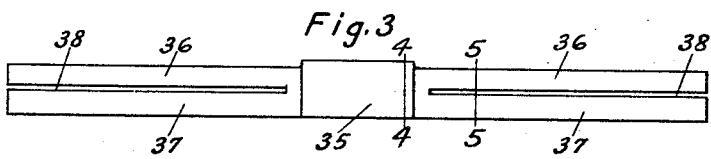 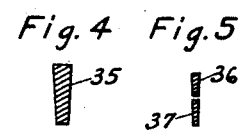
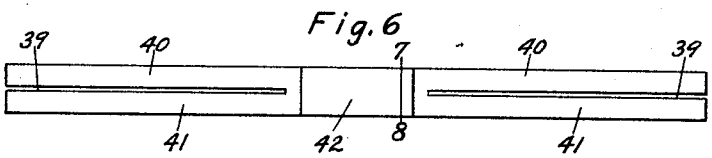 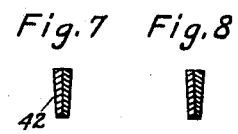
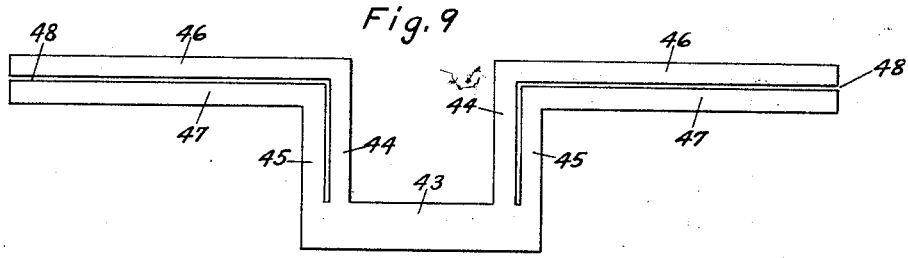
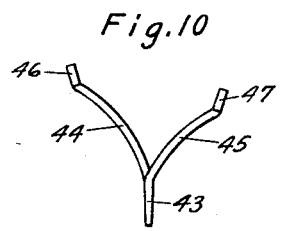
INVENTOR
Vincent G. Apple

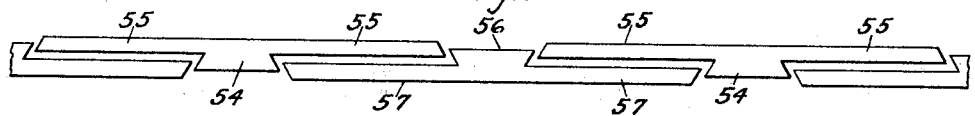
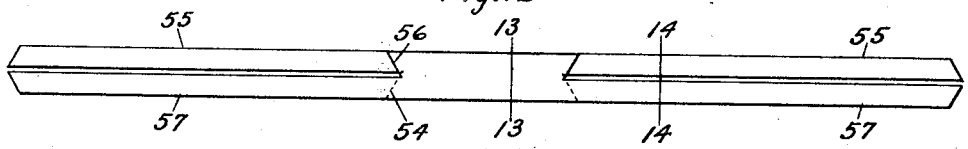
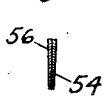 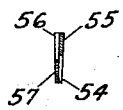 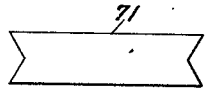 
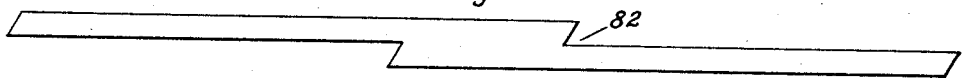
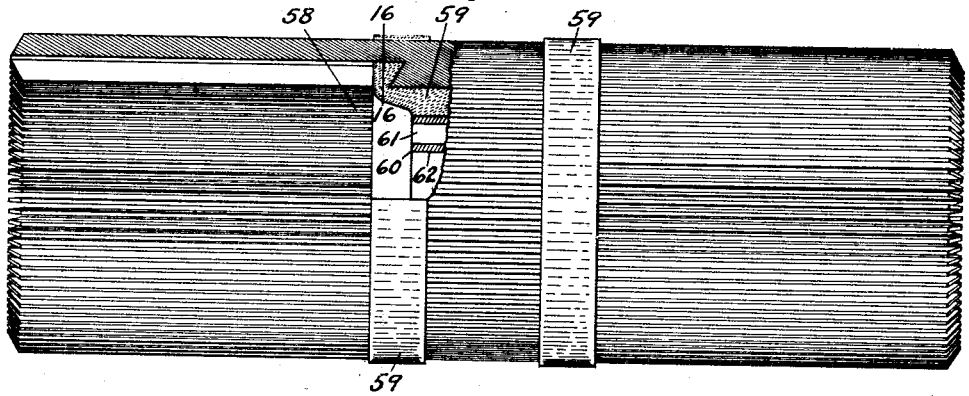

Sept. 16, 1930.   V. G. APPLE   1,775,634
BAR WINDING OF DYNAMO ELECTRIC MACHINE ELEMENTS
Filed June 14, 1928   3 Sheets-Sheet 3
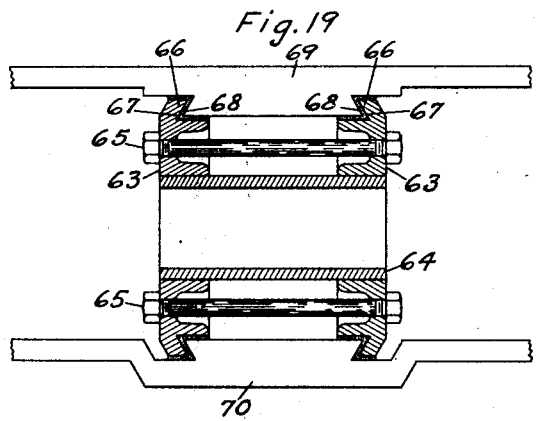
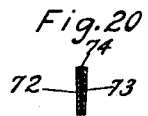
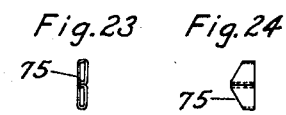
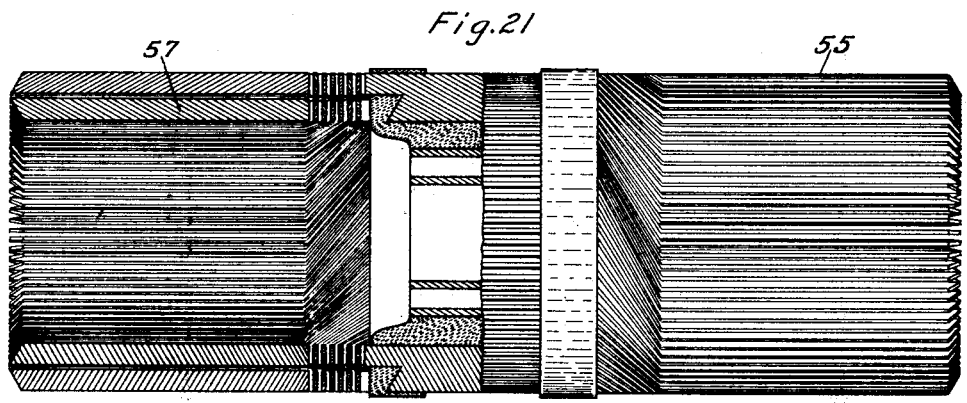
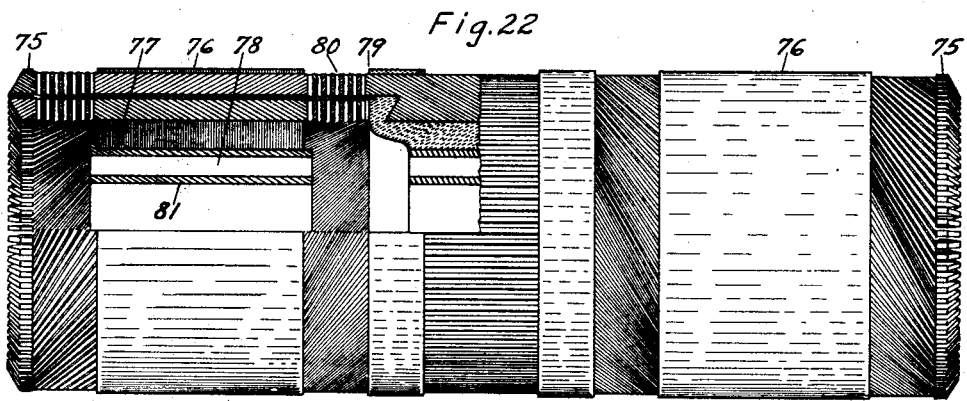
INVENTOR.
Vincent G. Apple Patented Sept. 16, 1930

1,775,634

UNITED STATES PATENT OFFICE

VINCENT G. APPLE, OF DAYTON, OHIO

BAR WINDING OF DYNAMO-ELECTRIC-MACHINE ELEMENTS

Application filed June 14, 1928. Serial No. 285,357.

My invention relates to that type of dynamo electric machine element wherein a commutator is employed in conjunction with the winding, and one object of my invention is to provide a structure wherein the bars of the commutator are integral parts of the winding turns, to the end that better electrical and mechanical connection may be had therebetween.

Another object of my invention is to so construct the parts, and to so arrange them in the completed wound element, that the commutator will be at the middle portion, instead of at the end as in common practice, such arrangement being of particular value in its application to railway use, where a motor armature is mounted directly on the car axle, the commutator and brushes being thus readily accessible from the floor board, which is commonly centrally located in the aisle of the car.

Further objects of, and uses for the invention will become apparent to those skilled in the art from a consideration of the following description, when taken in conjunction with the drawings, wherein—

Fig. 1 shows a unit of the winding as it appears before assembly with the magnetic portions of the element.

Fig. 2 is an end view of Fig. 1.

Fig. 3 shows a winding unit as it may appear before the conductor bars are spread apart to compose a winding turn.

Fig. 4 is a cross section taken at 4—4 of Fig. 3.

Fig. 5 is a cross section taken at 5—5 of Fig. 3.

Fig. 6 shows another method of providing a structure similar to that shown in Fig. 3.

Figs. 7 and 8 are cross sections, either of which may represent the section which appears when the segment is cut as at 7—8 Fig. 6.

Fig. 9 shows a method of making winding units from sheet stock.

Fig. 10 shows how units Fig. 9 are bent.

Fig. 11 shows an economical method of cutting the parts of winding units from rolled or drawn bar stock.

Fig. 12 shows how parts cut as in Fig. 11 are paired to compose winding units.

Fig. 13 is a cross section taken at 13—13 of Fig. 12.

Fig. 14 is a cross section taken at 14—14 of Fig. 12.

Fig. 15 shows an outline of a spacer which may be used between parts comprising the commutator.

Fig. 16 is a part section taken at 16—16 of Fig. 18.

Fig. 17 shows a method of achieving a result similar to that shown in Fig. 11.

Fig. 18 shows a structure wherein a plurality of the winding units have been assembled to compose a commutator, the portion broken away showing the means here employed to bind the units together.

Fig. 19 shows another commutator binding means.

Fig. 20 shows how rectangular, instead of wedge shaped bars are used when the cores employed have rectangular slots.

Fig. 21 shows the structure when ready for assembly with the cores.

Fig. 22 shows the complete armature built by my improved method.

Fig. 23 is an end view and Fig. 24 a side view of a clip which I may employ to assist in making the joints which complete the turns of the winding.

Similar numerals refer to similar parts thruout the several views.

In a single turn bar winding, as employed in common practice, each commutator segment has attached thereto two half turns of the winding usually so arranged that the one half turn is attached to the segment at a position nearer the axis of the armature than the other, so that the one half turn may occupy a position in the inner layer of the winding and the other half turn a position in the outer layer of the winding. This arrangement is carried out in effect in the embodiment of my invention herein illustrated and described, the improvement consisting, first, in providing a commutator of sufficient width to supply two windings, one at each end thereof, and second, in making the commutator bars and winding turns integral, variations in the method employed to form suitable winding turns being shown in detail.

In Figs. 1 and 2 I show a unit of the winding integrally comprising a commutator segment 30, two conductor bars 31 adapted to occupy positions in the outer layer of the winding, and two conductor bars 32 adapted to occupy positions in the inner layer of the winding, leads 33 connecting bars 31 to the segment 30, and leads 34 connecting bars 32 to segment 30. Bars 31 and 32 are spaced apart, circumferentially, a distance suitable to compose the desired winding turn, which is usually approximately the distance between alternate poles of the field element within which the armature is used. The segment 30 is shown in a position circumferentially midway between bars 31 and 32, but when desired, the relative length of leads 33 and 34 may be varied to locate the segment in other relative positions.

Figs. 1 and 2 show a winding unit as it appears when ready for assembly in the cores, and no effort is thereby made to show a method whereby it may be produced. It may be forged, sand or die cast, or otherwise fabricated to provide the contour shown.

In Fig. 3 I show a winding unit comprising a commutator segment 35 having two outer layer conductor bars 36 and two inner layer conductor bars 37 integrally extending, the bars being shown as they appear prior to being spread apart to compose winding turns. The method of making this unit consists of taking a length of bar stock of a cross section substantially that of the core slot within which it is to be used, placing it in a forging machine, and upsetting the portion 35 to provide the increased cross section suitable for the commutator segment, then splitting the remaining portions of the bar as at 38 to form conductor bars. The cross section Fig. 4 shows the contour of the segment, and the cross section Fig. 5 shows the contour of the conductor bars. The conductor bars are here shown to be of wedge shaped cross section, but it is obvious that where cores are to be used wherein the winding slots are of other shape, the bar stock may be selected to suit such other shape, and the forging dies may still be so made as to provide a commutator segment of the desired cross section.

Fig. 6 discloses a method of making a winding unit which eliminates the forging operation, and consists of taking a length of bar stock of a cross section substantially that of the core slot within which it is to be used, and adding a pad of such size and cross section as will make up the difference between the original bar and the desired commutator segment.

The bar is split as at 39 to form conductor bars 40 and 41. A cross section taken on the line 7—8, thru segment 42, may be as in Fig. 7 or 8. When the bar stock is but slightly wedge shaped, because the core slots so require, the pad may be slightly wedge shaped, so that the bar and pad together provide a segment as in Fig. 7. When the bar stock is more acutely wedge shaped a pad of rectangular cross section may be supplied to provide the desired segment as in Fig. 8, or, the bar stock may be of the rectangular cross section shown in Fig. 8, and the pad of the more acute wedge shape therein shown, in fact the bar stock may be of any cross section desired, to suit core slots of any shape, as long as the pad applied thereto makes up the difference between the bar stock and the desired segment. In cases where rectangular core slots are employed I may use parts cut from flat sheet stock, in place of rectangular bar stock.

When the requirements of design in an armature are such as to permit of a commutator considerably smaller in diameter than the armature core I may provide a winding unit as shown in Fig. 9, which comprises a commutator segment 43, leads 44 and 45, and conductor bars 46 and 47. This form of winding unit lends itself readily to cutting from flat sheet stock, but may be otherwise fabricated if desired. Leads 44 and 45 and bars 46 and 47 are formed by cutting apart as at 48. The leads 44 and 45 are bent to involute form as in Fig. 10, this form of lead being particularly applicable where limitations in armature length are imposed. Segment 43 may be brought to a wedge shape by striking flatwise in a die, or by some similar means.

Fig. 11 shows a length of bar stock which has been so cut that alternate pieces comprise, one a lug 54 having conductor bars 55 of the outer layer integrally extending, and the next a lug 56 having conductor bars 57 of the inner layer integrally extending. The bar stock from which these parts are cut is preferably of a wedge shaped cross section, and is readily obtainable, as it is commercially produced in varying wedge angles for use in making commutators of the conventional type, and the wedge shaped conductor bars which extend after the bars are cut are readily adaptable to cores having slots of a similar outline.

After parts are provided as in Fig. 11, they are arranged in pairs as in Fig. 12, with a lug 54 and a lug 56 adjacent, their flat sides in electrical contact.

Fig. 13 is a cross section taken on line 13—13 Fig. 12 and shows the two lugs 54 and 56 in electrical contact forming one commutator segment. When two parts are thus brought together to form a commutator segment they may be soldered, brazed, welded or otherwise joined or they may be sufficiently held in electrical contact by whatever means is finally employed to hold the segments of the commutator together. Fig. 14, a cross section taken at 14—14 of Fig. 12, shows how the conductor bars 55 and 57 extend in parallel direction, altho not in the same plane.

At 82, Fig. 17, I show a part cut from a length of bar stock, preferably of wedge shaped cross section, and it may readily be seen that such parts may be cut from the bar, one after the other thruout its length without waste and that if one such part is turned end for end and placed flatwise on another such part the result will be substantially the same as shown in Fig. 12.

Where a winding unit is composed of two adjacent layers as shown and described relative to Figs. 11 to 14 inclusive, or relative to Fig. 17, it is of course preferable that the parts thereof be of wedge shape cross section, as then the two wedge shaped lugs taken together may readily form a commutator segment. When however, consideration in design demand conductor bars of other cross section, I may still construct a winding unit in similar manner by combining a third piece in the form of a pad with the two commutator lugs, an example of the method being shown in Fig. 20, where 72 and 73 are lugs of rectangular cross section, the pad 74 supplying the difference between the cross section of the lugs and the cross section of the desired commutator segment. The pads may be cut to the outline shown at 71 Fig. 15, and the thickness of the pad may be varied to increase or decrease the commutator diameter, while the thickness of the conducting bars remain the same.

When a sufficient number of winding units have been provided, they are assembled in cylindrical formation, and the segments are bound together to compose a commutator having conductor bars integrally extending from each end. A preferred method of binding the segments consists of placing the structure in a mold, and molding fluid insulating material thru and about the segments, then hardening the material, or allowing it to harden, by heat or otherwise to form a solid mass as shown in Fig. 18. The part broken away as at 58 shows the insulating material 59 which serves as a binding means.

In Fig. 16 a section taken on line 16—16 of Fig. 18 shows how the insulating material 59 extends thru and about the conductor bars near the point where they join the commutator lugs. When the armature is of considerable size, a metal hub as at 60 having ventilating ducts as at 61 may be employed, or, the insulating material 59 may extend from the commutator lugs to the shaft bore 62, with or without ventilating ducts molded therein.

In Fig. 19 is shown another method of binding the assembled commutator segments, and consists of using heads 63 over a hub 64 drawn together by bolts 65, causing the undercut flanges 66 to force insulating rings 67 against the points 68 of the segments 69 and 70 to hold them together. This holding means is one commonly employed in commutator building, and is here shown only to point out the slight difference in the contour of the segments when using this type of holding means. At 69 is shown one commutator lug having outer conductor bars integrally extending, and at 70 one commutator lug having inner conductor bars integrally extending. These bars 69 and 70 may be produced in substantially the same manner as the bars shown in Figs. 11 or 17, and will result in very little waste material as long as the sum of the widths of the inner and outer layer conductor bars is substantially that of the bar stock used. Spacers of insulating material, as at 71 Fig. 15, are placed between segments, but must not be placed between the two lugs which together compose a segment.

These spacers, tho not essential, may also be used when the molding method is employed to bind the segments together, as by their use a different kind of insulating material may be had between the segments than is used as a binding means. A material may then be selected for the spacers which will wear away evenly with the commutator bars, while the material used as a binding means may be such as is best suited to serve its individual purpose regardless of wearing quality.

In the structures shown in Figs. 18 and 19 the winding units are assembled prior to making the bends which form leads, as at 33 and 34 Fig. 1, the purpose being to make all of these bends simultaneously after the units are bound together, tho if desired these bends may be made singly on each of the winding units before a binding means is applied. When structures are provided as in Figs. 18 and 19 the leads are preferably formed by bending simultaneously at least all conducting bars of a layer, or all layers may be bent at one and the same time. The method of forming leads for a bar winding by bending the bars of one layer in one direction and the bars of an adjacent layer in the other direction as now commonly practiced consists of first assembling the bars in the core, then bending the leads, then joining to each segment of a commutator a pair of leads which connect a bar of one layer to a suitably spaced apart bar of another layer. In the instant case however, the bars are first assembled to form a commutator, then bent to form leads and afterward assembled with the core.

Fig. 21 shows the structure after the leads have been so bent, the outer layer in one direction and the inner layer in the other direction, the remaining unbent portions of the bars, as at 55 and 57, being spaced and arranged in positions suitable to the core slots, and are thus adapted for endwise entry therethru, and while in the drawing I show cores having slots which are entirely closed, the method applies equally to cores having winding slots which are partially or entirely open.

After the structure is brought to the form shown in Fig. 21 two cores are provided, one for each end, and the straight portions of the winding 55 and 57 are entered into the slots of the cores, the straight ends of the windings extending thru and beyond the ends of the cores. These extending ends are then bent in a manner similar to the bends at the other ends of the cores, after which they are paired and joined to complete the circuit. The joints may be maintained by soldering, brazing, welding, or otherwise, welding being an approved method.

In Fig. 22 I show a completed armature made by my improved method, a sheet metal end connector 75 being placed on each pair of ends to assist in making the joint, the end connector being shown in detail in Figs. 23 and 24. The cores 76 are mounted on hubs 77 having ventilating ducts 78, and as the commutator binding means ends at 79, openings are left between the bent portions 80 of the bars to coact with the ventilating ducts 78 to keep the armature cool. In armatures of relatively small diameter the hubs 77 may be omitted, and the core laminæ may extend to the shaft bore 81, and they may or may not have ventilating ducts punched therethru.

The method of completing the circuit by bending the ends of the bars which project thru and beyond the cores is greatly preferred, tho where space permits, separate yokes or end connectors may be joined to the ends of the bars to eliminate bending of the bars themselves after they are assembled with the cores.

In the structure herein shown a conductor bar consists of but one layer of conducting material, but where advantages to be gained so justify each conducting bar may be composed of laminæ of conducting material without other material change in structure.

While I have herein disclosed methods and permissible variations in design and in the order of operations required to produce a wound element embodying my improvements, various other changes in the details thereof and in the order of operations pursued may be made without departing from the spirit of the invention or exceeding the scope of the following, wherein I claim:

1. As part of an armature, a structure comprising a plurality of conductor bars in two concentric cylindrical layers with widened one layer portions at the middle of the bars occupying space equal to that taken by both layers, and a mass of insulation molded in situ about the widened portions to compose a commutator having the two layer portion of the bars extending from both ends thereof.

2. As part of an armature, a structure comprising a plurality of conductor bars in two concentric cylindrical layers with widened one layer portions at the middle of the bars occuping space equal to that taken by both layers, a mass of insulation molded in situ about the widened portions to compose a commutator having the two layer portion extending from the ends of the insulation, bent portions of the layers extending one layer helically right handed and the other layer helically left handed for a relatively short ways beyond the insulation at both ends, and axially parallel straight portions extending from the bent portions for the remainder of their length.

3. An armature comprising two co-axial spaced apart cores, a plurality of conductor bars arranged in two concentric cylindrical layers in the winding apertures of said cores, said bars having widened portions midway of their length between the two said cores, said widened portions occupying space equal to that taken by the two said layers, a commutator segment binding means extending about the widened portions to compose a commutator having the two layer portion extending from the ends thereof, bent portions of the layers extending one layer helically right handed and the other layer helically left handed between said commutator and both said cores, axially parallel portions extending through said cores, and helically bent portions beyond the outer ends of the cores joining the bars in continuous circuit.

4. Steps in the method of making an armature which consists of arranging a plurality of conductor bars in two concentric cylindrical layers with widened parts of the bars in a single cylindrical layer, molding a mass of insulation about the widened parts of the bars to compose a commutator, then bending the bars where they emerge from the insulation mass, the one layer helically right handed and the other layer helically left handed for a relatively small part of their length, and leaving them axially parallel for the remainder of their length.

5. The steps recited in claim 4 and in addition thereto, endwise entering the axially parallel parts of the bars into the apertures of a core until they project through and beyond the end of the core, then bending and joining the projecting ends to complete the circuit.

In testimony whereof I hereunto set my hand.

VINCENT G. APPLE.